Patented Aug. 13, 1935

2,011,050

UNITED STATES PATENT OFFICE

2,011,050

METHOD OF TREATING GRAIN TO PRODUCE GRITS AND FLAKES

Lincoln S. Greenwood, Rochester, N. Y., assignor of one-half to John H. Newman, Rochester, N. Y.

No Drawing. Application June 29, 1933, Serial No. 678,259

14 Claims. (Cl. 99—10)

This invention relates to a method of treating grain to produce grits and flakes, and has reference more particularly to the processing of cereal grains so as to obtain a flake such as used in breweries, paste factories, and other industries.

The primary purpose of the invention is to utilize the entire original volume of grain without any substantial waste or loss, and at the same time produce a flake that is superior to those made by former methods, in that it has a lower fat content, is more quickly soluble, and forms a solution that can be more thoroughly clarified.

Heretofore in producing flakes, the practice has been to make grits by grinding and separating the grain. This procedure results in a large volume of flour which is a by-product and must be sold at considerably lower prices than can be obtained for grits or flakes, and it is one of the purposes of the invention to utilize all of the flour by-product and restore it to commercial grit or flake form.

Another purpose of the invention is to enable producing a higher quality and superior flake by first reducing the entire volume of grain to the form of flour, then working the flour into a dough, forming the dough into grits, and finally processing the grits to produce flakes.

A further purpose of the invention is to afford a method by which flour from grains such as corn, rice, and oats, that contain no insoluble proteins, can be formed into a dough which is treated to produce grits, and thereafter converted into flakes.

The invention is especially applicable in the processing of corn, of which a large volume of flour is a residual or by-product from present methods of producing grits, and one of the chief advantages of the invention lies in reconverting such corn flour into grits or flakes, although the invention is equally applicable in the processing of other grains, such as rice, oats, barley and wheat.

According to a preferred method, corn flour such as is available as a by-product from usual grinding methods may be used, or the grain in its original form may be reduced to the state of flour. The flour is then mixed with water at a suitable temperature, which in the case of corn, rice and oats, is above the gelatinizing point of the starches in the grain. Experience up to the present time has indicated that satisfactory results can be had with temperatures from a low point of about 140° F. to a maximum of slightly above the boiling point.

In the case of wheat, the flour is mixed with water preferably lukewarm or tepid, while in the case of barley, the temperature of the water is preferably somewhere above a minimum of above 140° F. and below a maximum of 175° F. Within this range of temperatures in the case of barley, the proteolytic enzymes are not destroyed, and the diastatic action of the starches is enhanced.

In the case of corn, rice and oats, a part of the fat content is dissolved by the water, and then driven off during the drying process, and this results in a reduction of the fat content of the grain product due to evaporation or oxidation and brings about a superior flake, with a lower fat content than commercial grits and flakes heretofore produced, making the product more desirable for brewing purposes.

The mixing continues for a sufficient length of time to produce a dough of the proper consistency to be formed into grits, and takes place in any suitable dough or paste mixer of conventional form, such as available on the market, and capable of holding the contents at the required temperatures during the mixing operation.

The insoluble proteins in some grain flour impart the viscous properties to dough when mixed with water, and since corn, rice and oats contain no insoluble proteins, they will not produce a dough sufficiently viscous to hold together except when subjected during the mixing operation to a temperature above the gelatinizing point, resulting in the development of gummy constituents from the carbohydrate group which holds the dough together in a proper state to permit it to be formed into grits.

After a complete and thorough mixing of the dough for about fifteen minutes at the above stated temperatures in a machine with suitable mixing and kneading arms, the dough is formed into grits by putting it through a conventional extruding press. The dough is forced under hydraulic or other suitable pressure through dies of predetermined size and shape, as called for by the particular requirements, and as the dough comes from the dies, a rotary or other cutter operates to sever the grits from the main body of dough. Such a machine is not new but is available on the market and will operate in a practical way for forming a body of dough into grits of any desired shape or size, the diameter or thickness of the grit being governed by the size of the opening in the die, and the length of the grit being governed by the speed of movement of the knife which severs it.

The grits thus formed are preferably carried away on a perforate apron through which air is passed at such a velocity as to slowly dry the grits but not lift them from the apron. They are carried from one apron to another until brought to atmospheric temperature when most of the moisture is evaporated. The final drying may be had by passing heated air through the grits until the desired moisture content is reached, and they can then be aspirated to separate the fines which are returned to the mixer.

After the grits are properly dried, they are subjected to the action of heated rolls which form the grits into flakes. Machinery for flaking grits is available on the market, and where the grits are immediately subjected to the action of flaking rolls, the grits are dried only to a point of about seventeen percent moisture and then immediately flaked.

When the grits are not immediately converted into flakes, they are usually dried to a point where the moisture content is about thirteen percent, permitting them to be stored or shipped as refined grits, and when these are subsequently flaked, the proper amount of moisture is added, depending on the temperature of the flaking rolls, by adding cold water to the grits and permitting them to stand for a sufficient length of time to permit the moisture to penetrate the body of the grits before they are passed through the flaking rolls which are at high temperatures.

By this invention it is possible to take corn flour, resulting from the conventional manufacture of grits and meal, and convert it into a commercial grit or flake even superior to those made by previous methods. Such a corn flour has a high fat content and relatively high rancidity which makes it objectionable and greatly reduces its market value, but with the process herein disclosed, such flour can be converted into grits or flakes suitable for brewers and paste manufacturers, and will command a price as high as regular commercial grits and flakes.

By processing oat flour, flakes can be produced which afford a palatable pre-cooked food requiring no further cooking. Barley may be milled into flour and by controlling the mixing temperature as herein indicated, the resulting flakes are equal in value and commercial results to barley malt, which requires on the average of five days for completion, while barley flakes may be made under this invention continuously and without interruption.

Where reference is made throughout the specification and claims to "insoluble proteins", it is intended to refer to gliadin and glutenin, which in combination are known as gluten and found largely in wheat, barley and rye.

While this application discloses certain procedures that have thus far been found to be successful and preferable, the invention is not restricted to any of the specific steps or limits described, but this application is intended to cover the principles disclosed insofar as they may be embodied in any modified procedures or adaptations of the method, as may come within the scope of the following claims.

I claim:

1. The method which consists in mixing grain flour with water to produce a dough, the temperature of the water being such when mixed with the flour as to produce a dough having a temperature below 212° F., forming the dough into grits without boiling or baking the dough, and thereafter forming the grits into flakes which are untoasted.

2. The method which consists in mixing grain flour with water to produce a dough, the temperature of the water when mixed with the flour being such as to produce a dough having a temperature above the gelatinizing point of the flour and below 212° F., forming the dough into grits without boiling or baking the dough, and thereafter forming the grits into flakes which are untoasted.

3. The method which consists in mixing corn flour with water to produce a dough, the temperature of the water when mixed with the flour being such as to produce a dough having a temperature above the gelatinizing point of the flour and below 212° F., forming the dough into grits without boiling or baking the dough, and thereafter forming the grits into flakes which are untoasted.

4. The method which consists in mixing rice flour with water to produce a dough, the temperature of the water when mixed with the flour being such as to produce a dough having a temperature above the gelatinizing point of the flour and below 212° F., forming the dough into grits without boiling or baking the dough, and thereafter forming the grits into flakes which are untoasted.

5. The method which consists in mixing grain flour with water to produce a dough, the temperature of the water when mixed with the flour being such as to produce a dough having a temperature above the gelatinizing point of the flour and below 212° F., forming the dough into grits without boiling or baking the dough, and drying the grits.

6. The method which consists in mixing corn flour with water to produce a dough, the temperature of the water when mixed with the flour being such as to produce a dough having a temperature above the gelatinizing point of the flour and below 212° F., forming the dough into grits without boiling or baking the dough, and drying the grits.

7. The method which consists in mixing rice flour with water to produce a dough, the temperature of the water when mixed with the flour being such as to produce a dough having a temperature above the gelatinizing point of the flour and below 212° F., forming the dough into grits without boiling or baking the dough, and drying the grits.

8. The method which consists in reducing grain to flour, mixing the flour with water to produce a dough, the temperature of the water when mixed with the flour being such as to produce a dough having a temperature below 212° F., forming the dough into grits, and thereafter forming the grits without boiling or baking the dough into flakes which are untoasted.

9. The method of producing grits from grain containing no insoluble proteins, which consists in reducing the grain to flour, mixing the flour with water to produce a dough, the temperature of the water when mixed with the flour being such as to produce a dough having a temperature below 212° F., and thereafter forming the dough into grits without boiling or baking the dough.

10. The method of producing grits from corn, which consists in reducing corn to flour, mixing the flour with water to produce a dough, the temperature of the water when mixed with the flour being such as to produce a dough having a temperature below 212° F., and thereafter forming the dough into grits without boiling or baking the dough.

11. The method of producing grits from rice, which consists in reducing rice to flour, mixing the flour with water to produce a dough, the temperature of the water when mixed with the flour being such as to produce a dough having a temperature below 212° F., and thereafter forming the dough into grits without boiling or baking the dough.

12. The method of producing flakes from grain containing no insoluble proteins, which consists in reducing the grain to flour, mixing the flour with water to produce a dough, the temperature of the water when mixed with the flour being such as to produce a dough having a temperature below 212° F., forming the dough into grits, and thereafter forming the grits without boiling or baking the dough into flakes which are untoasted.

13. The method of producing flakes from corn containing no insoluble proteins, which consists in reducing the corn to flour, mixing the flour with water to produce a dough, the temperature of the water when mixed with the flour being such as to produce a dough having a temperature below 212° F., forming the dough into grits, and thereafter forming the grits without boiling or baking the dough into flakes which are untoasted.

14. The method of producing flakes from rice containing no insoluble proteins, which consists in reducing the rice to flour, mixing the flour with water to produce a dough, the temperature of the water when mixed with the flour being such as to produce a dough having a temperature below 212° F., forming the dough into grits, and thereafter forming the grits without boiling or baking the dough into flakes which are untoasted.

LINCOLN S. GREENWOOD.